(12) United States Patent
Racunas, Jr.

(10) Patent No.: US 6,501,391 B1
(45) Date of Patent: Dec. 31, 2002

(54) INTERNET COMMUNICATION OF PARKING LOT OCCUPANCY

(76) Inventor: Robert Vincent Racunas, Jr., 4043 Heatherstone Ct., Fairfax, VA (US) 20030

( * ) Notice: Subject to any disclaimer, the term of this patent is extended or adjusted under 35 U.S.C. 154(b) by 23 days.

(21) Appl. No.: 09/671,363

(22) Filed: Sep. 28, 2000

Related U.S. Application Data

(60) Provisional application No. 60/156,391, filed on Sep. 28, 1999.

(51) Int. Cl.[7] ................................................. B60Q 1/48
(52) U.S. Cl. .................... 340/932.2; 340/539; 340/928; 235/378; 235/384; 705/13; 705/418
(58) Field of Search ................................ 340/506, 539, 340/932.2, 928, 870.02, 870.07, 870.09; 235/378; 194/902; 705/13, 418

(56) References Cited

U.S. PATENT DOCUMENTS

| | | | |
|---|---|---|---|
| 5,091,727 A | 2/1992 | Mahmood | 340/932.2 |
| 5,432,508 A | 7/1995 | Jackson | |
| 5,504,314 A | 4/1996 | Farmont | 235/384 |
| 5,648,906 A | 7/1997 | Amirpanahi | 364/464.28 |
| 5,748,107 A | 5/1998 | Kersken et al. | 340/905 |
| 5,751,973 A | 5/1998 | Hassett | 395/213 |
| 5,877,704 A | 3/1999 | Yoshida | 340/932.2 |
| 5,910,782 A | 6/1999 | Schmitt et al. | |
| 5,940,481 A | 8/1999 | Beitman | |
| 6,037,880 A * | 3/2000 | Manion | 340/932.2 |
| 6,081,206 A | 6/2000 | Kielland | 340/937 |
| 6,097,313 A | 8/2000 | Takahashi et al. | 340/905 |
| 6,107,942 A | 8/2000 | Yoo et al. | 340/932.2 |
| 6,112,152 A | 8/2000 | Tuttle | |
| 6,124,808 A | 9/2000 | Budnovitch | 340/932.2 |
| 6,138,072 A | 10/2000 | Nagai | 701/200 |
| 6,142,702 A | 11/2000 | Simmons | 404/6 |
| 6,147,624 A | 11/2000 | Clapper | 340/932.2 |
| 6,148,253 A | 11/2000 | Taguchi et al. | 701/48 |
| 6,169,897 B1 | 1/2001 | Kariya | 455/426 |
| 6,202,008 B1 | 3/2001 | Beckert et al. | 701/33 |
| 6,205,396 B1 | 3/2001 | Teicher et al. | 701/200 |
| 6,208,934 B1 | 3/2001 | Bechtolsheim et al. | 701/209 |
| 6,209,026 B1 | 3/2001 | Ran et al. | 709/218 |
| 6,229,455 B1 | 5/2001 | Yost et al. | 340/942 |
| 6,230,868 B1 | 5/2001 | Tuxen et al. | 194/217 |
| 6,236,337 B1 | 5/2001 | Beier et al. | 340/905 |
| 6,243,029 B1 | 6/2001 | Tomer | 340/932.2 |
| 6,246,337 B1 | 6/2001 | Rosenberg et al. | 340/932.2 |
| 6,249,233 B1 | 6/2001 | Rosenberg et al. | 340/932.2 |
| 6,252,523 B1 | 6/2001 | Moström | 340/928 |
| 6,253,980 B1 | 7/2001 | Murakami et al. | 224/510 |
| 6,266,609 B1 | 7/2001 | Fastenrath | 701/200 |
| 6,272,332 B1 | 8/2001 | Matsumoto et al. | 455/412 |

FOREIGN PATENT DOCUMENTS

| | | | | |
|---|---|---|---|---|
| FR | WO 98/45823 | 10/1998 | | G08G/1/127 |
| WO | WO 97/13222 | 4/1997 | | G07B/15/02 |
| WO | WO 98/49665 | 11/1998 | | G08G/1/14 |
| WO | WO 99/48062 | 9/1999 | | G07F/7/00 |
| WO | WO 00/00942 | 1/2000 | | G08G/1/14 |

(List continued on next page.)

OTHER PUBLICATIONS

Jek Kian Jin, *Driver Upgrades,* Life! Section of Straits Times, Jun. 1999, available at http://www.best.com/~kian-jin/sv–life/sv–erpcam.html (accessed Aug. 8,2001).

(List continued on next page.)

*Primary Examiner*—Daryl Pope

(57) ABSTRACT

A server transmits parking lot occupancy information over the Internet. The parking lot occupancy information is capable of being reproduced by a remote display device as a real-time representation of the parking lot indicating vacant parking spaces. When presented with the real-time representation of the parking lot, a commuter readily can locate an available parking space or decide to search for parking elsewhere.

20 Claims, 5 Drawing Sheets

FOREIGN PATENT DOCUMENTS

| WO | WO 00/08484 | 2/2000 | ........... G01S/15/93 |
|---|---|---|---|
| WO | WO 00/23949 | 4/2000 | ............ G07C/1/30 |
| WO | WO 00/41142 | 7/2000 | ............ G07C/1/30 |
| WO | WO 00/46068 | 8/2000 | ............ B60Q/1/48 |
| WO | WO 00/55816 | 9/2000 | ........... G07B/15/02 |
| WO | WO 00/59201 | 10/2000 | .......... H04M/15/00 |
| WO | WO 01/41029 | 7/2001 | ........... G06F/17/60 |

OTHER PUBLICATIONS

Press Release, Alcatel va intégrer la technologies de Webraska pour fournir des services de cartographie aux utilisateurs de GSM, Jul. 1999, available at http://www.webraska,com/press/99–jul–1–fr.html.

Press Release: Alcatel and Webraska Partner to Provide Location–Based Services to GSM Users, Jul. 1999, available at http://www.mobic.com/news/9907/alcatel_and_webraska_partner_to_.htm.

Johnson City Med–Tech Corridor Its Project, Geographic Information Systems (GIS) Phase I Review and Phase II Prospectus, Oct. 1996, available at http://www.itsdocs.fhwa.dot.gov/%5CJPODOCS%5CREPTS$_{13}$TE/L401!.PDF.

European Commission, West European Local Legal Arrangements for Transport Information Management and Exchange of Data, Apr. 1998, available at http://www.rupprecht–consult.de/wtforeport.pdf and http://www.rupprecht--consult.de/wtfnreport.pdf.

Namgeun Jeong, Youngsu Chae, Aparna Pappu, Shashidhar Merugu, and Ramkumar Krishnan EZPark/RANSY Project, Oct. 1998, available at http://www.cc.gatech.edu/classes/cs6751_98_fall/projects/RANSY/.

Winfried Krux, Peter Hasberg, and Klaus Overkamp, Cologne ParkInfo A Contribution to Traffic Control Compatible with Environment and Urban Development, Presentation on the 5$^{th}$ ITS World Congress, Oct. 1998, available at http://152.99.129.29/cdrom/2147.pdf.

English translation of German web site http://www.koelnverkehr.de available at http://translate.google.com/translate?hl=en&sl=de&u=http://www.koelnverkehr.de/&prev=/search%3Fq%3Dkoeln verkehr%26hl%3Den%26safe%3Doff (accessed Jun. 19, 2001).

Press Release, Schlumberger, Schlumberger and Webraska Partner Up for World's First Demonstration of Hassel–free Parking Using WAP Mobile Phones, Mar. 2000, available at http://www.slb.com/print$_{13}$pr.cfm?prid=1321&printable=1.

Press Release, Mitsui & Co Ltd., Mitsui and Part 24 Establish Tie–Up For Providing Information on Parking Lots and Plan to Offer Related Information on a Real–Time Basis, Jan. 1997, available at http://www.mitsui.co.jp/tkabz/english/news/1997/971park.htm.

Parking Information—Osaka City: Parking space guidance system, ITS Handbook 1998, Section 4: ITS Toward Standard Deployment, available at http://www.its.go.jp/ITS/1998HBook/chapter4/4–8e.html.

*Real Time Traffic Information Systems,* Published as a Supplement to H&T, Mar. 1998.

Peter Hasberg and Dr. Dirk Serwill, The Stadtinfokoln Project in Cologne Information as the Key to Mobility and Traffic Management, ECMT/OECD, Dec. 1999.

Bikash Ron Pati, Evaluation of Parking Guidance Systems: A Unique Approach, 1997, Flite, available at http://uftrc-.ce.ufl.edu/fsite/pati.htm.

Keith Gavin, Parking Guidance Comes of Age, Urban Mobilty Professional, Jan. 1999, Issue 7, available at http://docs.vircomnet.com/mobility/parking_vc/Papers_Full_Documents_K.Gavin_0001_0001.htm.

Niko I. Leoutsarako, Management Technology for the Private Parking Industry, Urban Mobility Professional, Jan. 1999, Issue 7, available at http://docs.vircomnet.com/mobility/parking_vc/leoutsarakos0002.htm.

Nikos I. Leoutsarakos, Parking On Street Goes Wireless, Urban Mobility Professional, Jan. 1999, Issue 7, available at http://docs.vircomnet.com/mobility/parking_vc/leoutsarakos0002.htm.

Press Release, Ford Motor company, Ford takes the stress out of city driving, Jun. 1999, available at http://www.media.ford.com/article_display.cfm?article_id=1914.

Andrew Ryder, No Place To Park, Heavy Duty Trucking, Jul. 1999, available at http://www.heavytruck.com/hdt/1999/07/020a9907.html.

Dr. Andreas Scholtz, Parking Technology Beyond the Year 2000, Oct. 1999, available at http://docs.vircomnet.com/mobility/parking_vc/Andreas_Scholtz.doc and http://www.parking–net.com.

Press Release, NETSYSTEC GmbH, Video Broadcast System for Providers, Nov. 25, 1999 available at http://www-.netsystec.com/engl/presse/artikel/VS16_PowerEngine-.htm.

Press Release, NETSYSTEC GmbH, Video Shuttle by NETSYSTEC being used in Cologne's Traffic Information Service www.koelnverkehr.de, Dec. 25, 1999 available at http://www.netsystec.com/engl/presse/artikel/VS16_koelnverkehr.htm.

Press Release, Shark Byte Systems Inc., New Revenue System Runs Exclusively on the Net, Parking Today, Mar. 2000, available at http://www.sharkbytesystems.com/press/1.htm.

Press Release, Shark Byte Systems, Inc., The Internet Revolution Comes to Parking, Parking, Apr. 2000, available at http://www.sharkbytesystems.com/press/2.htm.

http://www.parking.org/cgi–bin/rbox/get/forums/software-.html, hardcopy printout, pp. 1–4.

http://www.parking.org/cgi–bin/rbox/get/forums/software/20.html, hardcopy printout, p. 1.

http://www.parking.org/cgi–bin/rbox/get/forums/software/20/1.html, hardcopy printout, p. 2.

http://www.tele–parking.com, pp. 1–42.

\* cited by examiner

INTERNET COMMUNICATION OF PARKING LOT OCCUPANCY

This application claims the benefit of U.S. Provisional Application No. 60/156,391, filed Sep. 28, 1999.

TECHNICAL FIELD

The present invention relates generally to Internet communication. More particularly, the present invention relates to Internet communication of parking lot occupancy data.

BACKGROUND

Locating a vacant parking space is an ordeal that causes frustration for many commuters. Even if a commuter pays to enter a parking lot, valuable time is consumed searching for a parking space within the parking lot. It seems that parking lots that service hospitals, airports, mass transit stations, entertainment forums, shopping malls, and the like are always the most crowded, when time is the most crucial. As urban and suburban regions become more populated, finding a vacant parking space will become increasingly difficult for commuters.

Several prior art devices have attempted to facilitate locating a parking space. In particular, U.S. Pat. No. 5,293,163 to Kakihara et al. ('163 patent) discloses a system for locating garages with available parking spaces. According to the '163 patent, the location of a parking garage having available parking is displayed in map format.

U.S. Pat. No. 5,432,508 to Jackson ('508 patent) discloses a technique for informing vehicle operators of available parking spaces in a parking garage. According to the '508 patent, light sources mounted above the parking spaces and at the entrance to the parking garage are used to indicate the location of available spaces. The '508 patent also discloses a computer which collects information concerning parking availability and communicates the information to prospective users. Namely, a person can place a telephone call and receive a voice message indicating whether the parking lot is full.

U.S. Pat. No. 5,910,782 to Schmitt et al. ('782 patent) discloses a system for finding available on-street parking using an on-board vehicle navigation system and parking meters equipped with sensing devices. According to the '782 patent, real time metered parking space information can be accessed from a central location or directly by a vehicle, upon entering a specific geographic area.

U.S. Pat. No. 5,940,481 to Zeitman ('481 patent) discloses a parking management control system used to report parking, monitor parking and reserve parking spaces. According to the '481 patent, a user reports parking in a particular parking facility to a central control unit using a personal non-dedicated mobile communications device. The central control unit then confirms whether parking in the particular parking facility is authorized or not. The central control unit also generates a report indicating which parking facilities are supposed to be vacant for law enforcement officials so that unauthorized parking can be ticketed. The '481 patent also discloses that a user can reserve a desired parking facility by selecting a desired parking facility from a map provided from the central control unit. If a potential user, other than the registered user, communicates a request to park in the reserved parking facility, the central control unit transmits a response to the potential user indicating that the parking facility is reserved and not authorized for use.

SUMMARY

According to the present invention, a server transmits parking lot occupancy information over the Internet. Such parking lot occupancy information is capable of being reproduced by a remote display device as a real-time representation of the parking lot indicating vacant parking spaces. The real-time representation may be in the form of a textual listing, a graphical map, a video image, an Internet Web page or similar form. When presented with the real-time representation of the parking lot, a commuter can readily locate an available parking space or decide to search for parking elsewhere.

DETAILED DESCRIPTION

Figure 1:
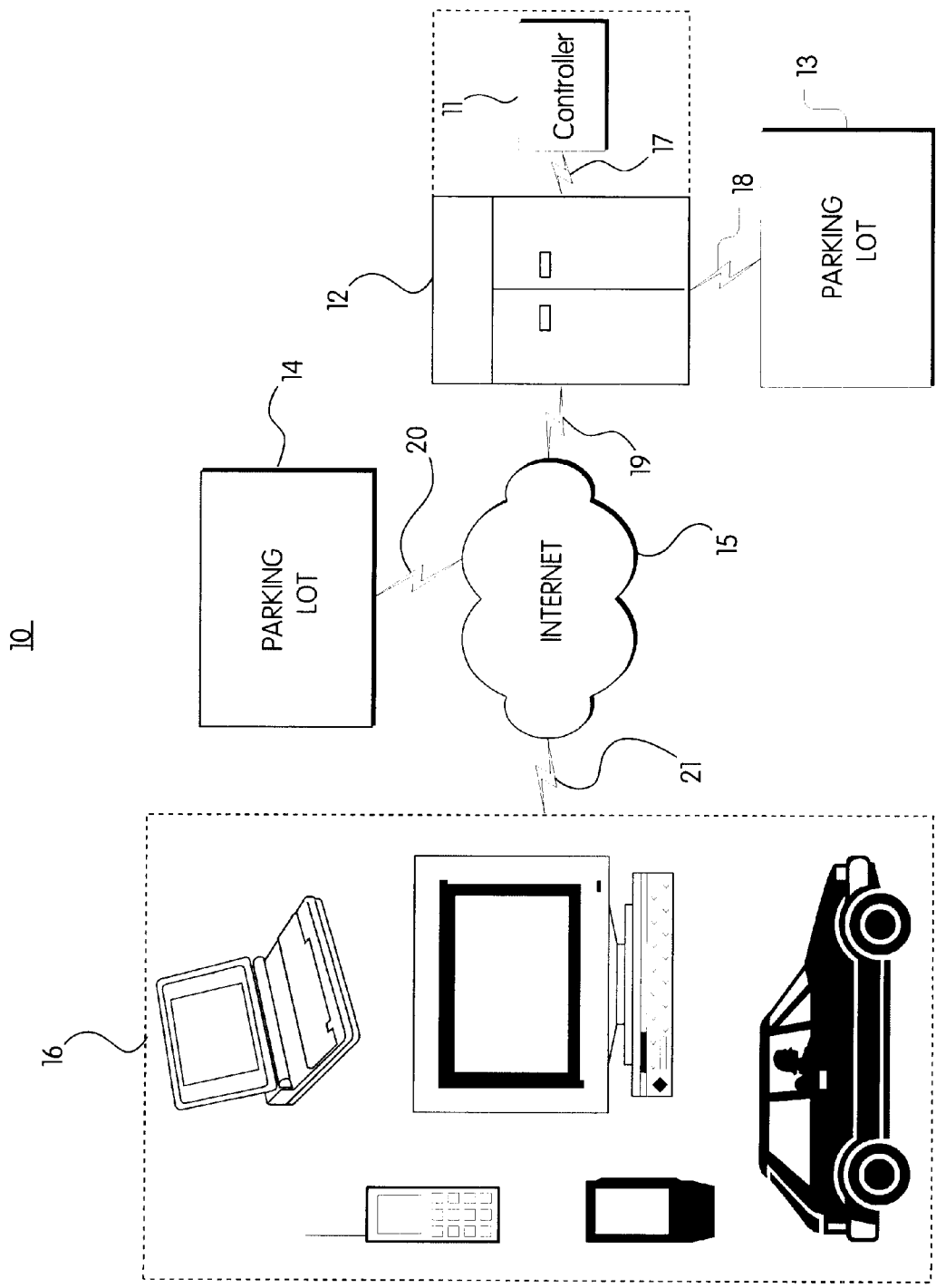
FIG. 1 is a block diagram of a communication network.

FIG. 1 illustrates a communication network 10 according to one embodiment of the present invention. The communication network includes a controller 11 for commanding a server 12 to transmit parking lot occupancy data corresponding to one or more parking lots 13, 14 through the Internet 15. For simplicity, only the basic components of the communication network 10 are shown. However, as would be understood by one of ordinary skill in the art, the communication network may include various other components and structures in actual implementation. For instance, although a first parking lot 13 and a second parking lot 14 are shown, the communication network may include only one parking lot or numerous parking lots.

The server 12 may be any type computer, computer system, server, settop box or other type of Internet accessible device and may include any type of hardware, software, application or program capable of functioning as described herein.

As indicated by the broken lines, the controller 11 may be either internal or external to the server 12. An example a controller 11 is a software application loaded on the server 12 for commanding and directing communications enabled by the server 12. Other examples include a program, a piece of code, an instruction, a device, a computer, a computer system, or a combination thereof, for independently or collectively instructing the server 12 to interact and operate as described herein. The controller 11 may be embodied permanently or temporarily in any type of machine, component, and/or equipment. The controller 11 transmits commands to the server through a first connection 17, which may be any communication path capable of carrying commands between the controller 11 and the server 12.

As shown in FIG. 1, the server 12 is connected to the first parking lot 13 through a second connection 18. The second connection may be a serial, modem, telephone, cable, satellite, LAN (Local Area Network) including one or more other computers (not shown) or any other connection capable of carrying data between the first parking lot 13 and the server 12. The server 12 is also connected to the second parking lot 14 through the Internet 15 through a third connection 19 and a fourth connection 20. The third connection 19 and the fourth connection 20 may be any type of modem, cable, satellite or other type of connection capable of carrying data through the Internet 15 between the second parking lot 14 and the server 12. Each of the third connection 19 and fourth connection 20 may also include one or more intermediary computer systems or servers (not shown), such as an ISP (Internet Service Provider).

The first parking lot 13 and the second parking lot 14 may be any parking lot that services a hospital, airport, mass transit station, entertainment forum, shopping mall, department store, grocery store, or the like. Each of the first parking lot 13 and the second parking lot 14 are equipped with detectors (not shown) for detecting the status information for each of the parking lots 13, 14. The detectors may be any type of device capable of ascertaining whether a parking space is occupied or not. The detected status information includes at least the location of vacant parking spaces within the parking lots 13, 14. The status information, however, may include the occupancy status of every parking space within the parking lots 13, 14 or any other information concerning the status of the parking lots 13,14. The first parking lot and second parking lot are also equipped with communication devices (not shown) for communicating the status information to the server 12. The communications devices may be any type of internal or external device such as a computer, server, application, and/or program capable of conveying the status information to the server 12.

Referring again to FIG. 1, the server 12 is connected to a remote display device 16 through the Internet 15 through the third connection 19 and a fifth connection 21. The fifth connection 21 may be any type of modem, cable, satellite or other type of connection capable of carrying data through the Internet 15 between the server 12 and the remote display device 16.

Figure 2:
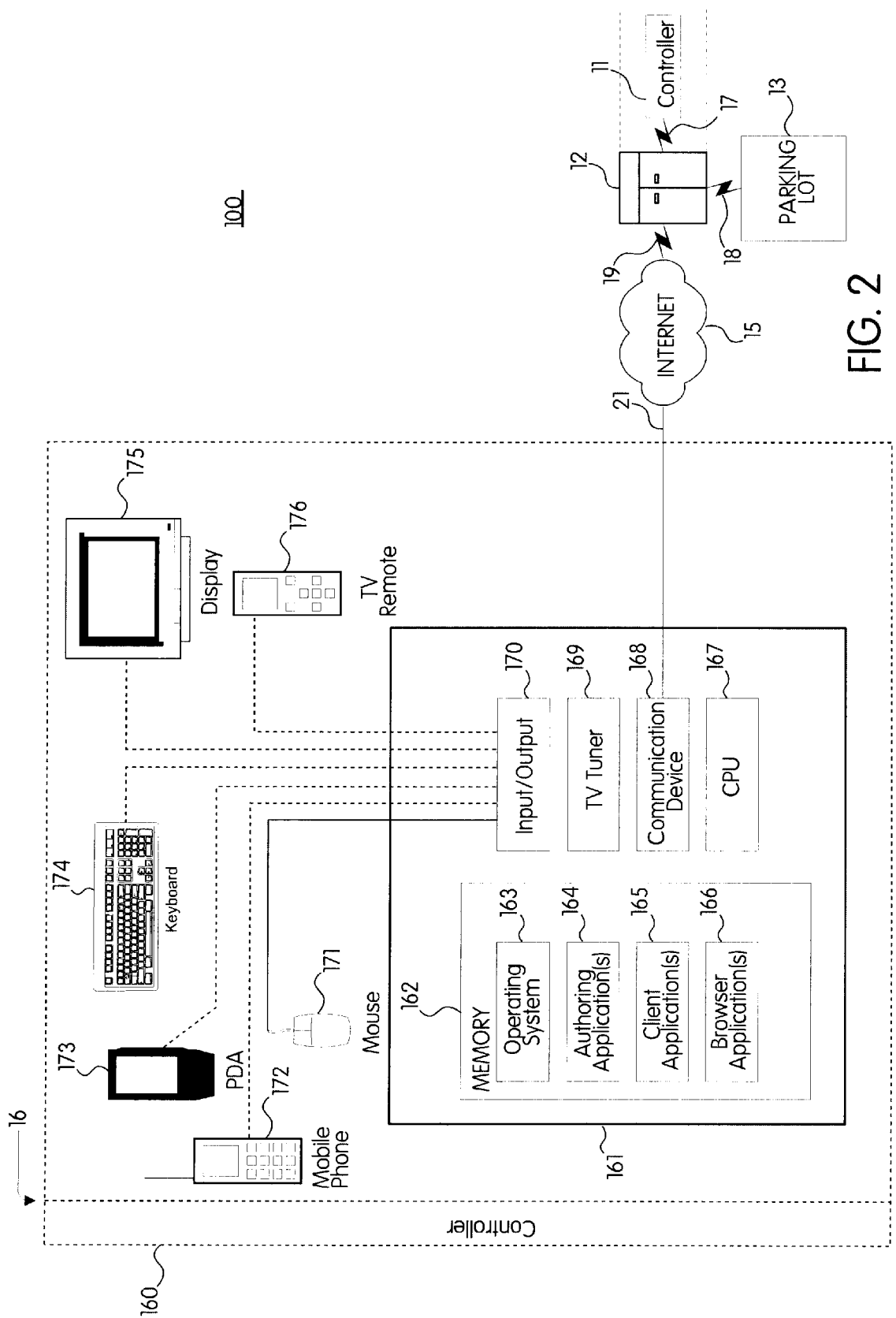
FIG. 2 is an expansion of the block diagram of FIG. 1.

FIG. 2 illustrates a communication network 100 including a display device 16 communicating with a server 12 through the Internet 15. The server 12 may include one or more server controllers 11 for controlling the server 12. Communication pathway 19 and communication pathway 21 enable wired or wireless communication between the server 12 and the display device 16 through the Internet 15.

The remote display device 16 may be any type computer, computer system, server, settop box or other type of Internet accessible device and may include any type of hardware, software, application or program capable of executing the functions described herein. The remote display device 16 may communicate with the server 12 through the Internet 15 and through wired or wireless communication pathways 19, 21. The display device 16 may include applications that enable textual or graphical display of information, such as an email application or an Internet browser application.

The display device 16 may include one or more device controllers 160 for controlling the display device 16. An example of device controller 160 is a software application loaded on the display device 16 for commanding and directing communications enabled by the display device 16. Other examples include a program, a piece of code, an instruction, a device, a computer, a computer system, or a combination thereof, for independently or collectively instructing the display device 16 to interact and operate as described herein. The display controller 160 may be embodied permanently or temporarily in any type of machine, component, equipment, storage medium, or propagated signal capable of providing instructions to the client device 16.

In one implementation, the display device 16 is a portable device, such as, for example, a vehicle-mounted device or a hand-held device. The display device 16 includes a general purpose computer 161 having an internal or external storage 162 for storing data and programs such as an operating system 163 (e.g., DOS, Windows™, Windows 95™, Windows 98™, Windows 2000™, Windows NT™, OS/2, or Linux) and one or more application programs. Examples of application programs include authoring applications 164 (e.g., word processing, database programs, spreadsheet programs, or graphics programs) capable of generating documents or other electronic content; client applications 165 capable of communicating with other computer users, accessing various computer resources, and viewing, creating, or otherwise manipulating electronic content; and browser applications 166 (e.g., Netscape's Navigator or Microsoft's Internet Explorer) capable of rendering standard Internet content.

The general-purpose computer 161 also includes a central processing unit 167 (CPU) for executing instructions in response to commands from the device controller 160. In one implementation, the device controller 160 includes one or more of the application programs installed on the internal or external storage 162 of the general-purpose computer 161. In another implementation, the device controller 160 includes application programs externally stored in and performed by one or more device(s) external to the general-purpose computer 160.

The general-purpose computer typically will include a communication device 168 for sending and receiving data. One example of the communication device 168 is a modem. Other examples include a transceiver, a set-top box, a communication card, a satellite dish, an antenna, or another network adapter capable of transmitting and receiving data over wired or wireless data pathway 21. The general-purpose computer 161 also may include a TV ("television") tuner 169 for receiving television programming in the form of broadcast, satellite, and/or cable TV signals. As a result, the display device 16 can selectively and/or simultaneously display Internet content received by communications device 168 and television programming content received by the TV tuner 169.

The general-purpose computer 161 may include an input/output interface 170 for wired or wireless connection to various peripheral devices. Examples of peripheral devices include, but are not limited to, a mouse 171, a mobile phone 172, a personal digital assistant 173 (PDA), a keyboard 174, an on-board vehicle or PC display monitor 175 with or without a touch screen input, and/or a TV remote control 176 for receiving information from and rendering information to subscribers.

Although FIG. 2 illustrates device such as a mobile telephone 172, a PDA 173, and a TV remote control 176 as being peripheral with respect to the general-purpose computer 161, in another implementation, such devices may include the functionality of the general-purpose computer 161 and operate as the display device 16. For example, the mobile phone 172 or the PDA 173 may include computing and networking capabilities and function as a display device 16 by accessing the Internet 15 and communicating with the server 12. Furthermore, the display device 16 may include one, some or all of the components and devices described above.

Figure 3:
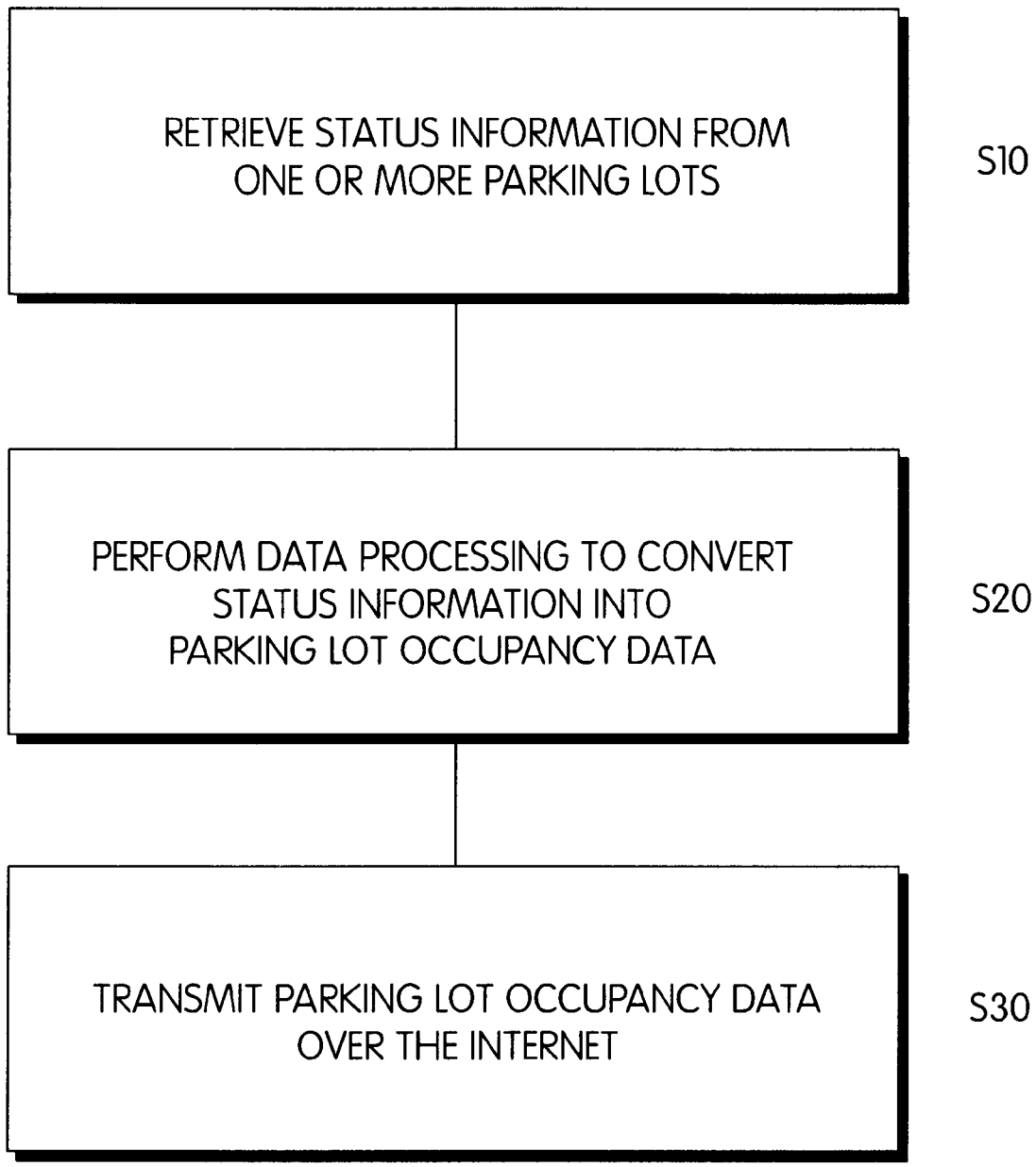
FIG. 3 is a flow chart of a communications method.
Figure 4:
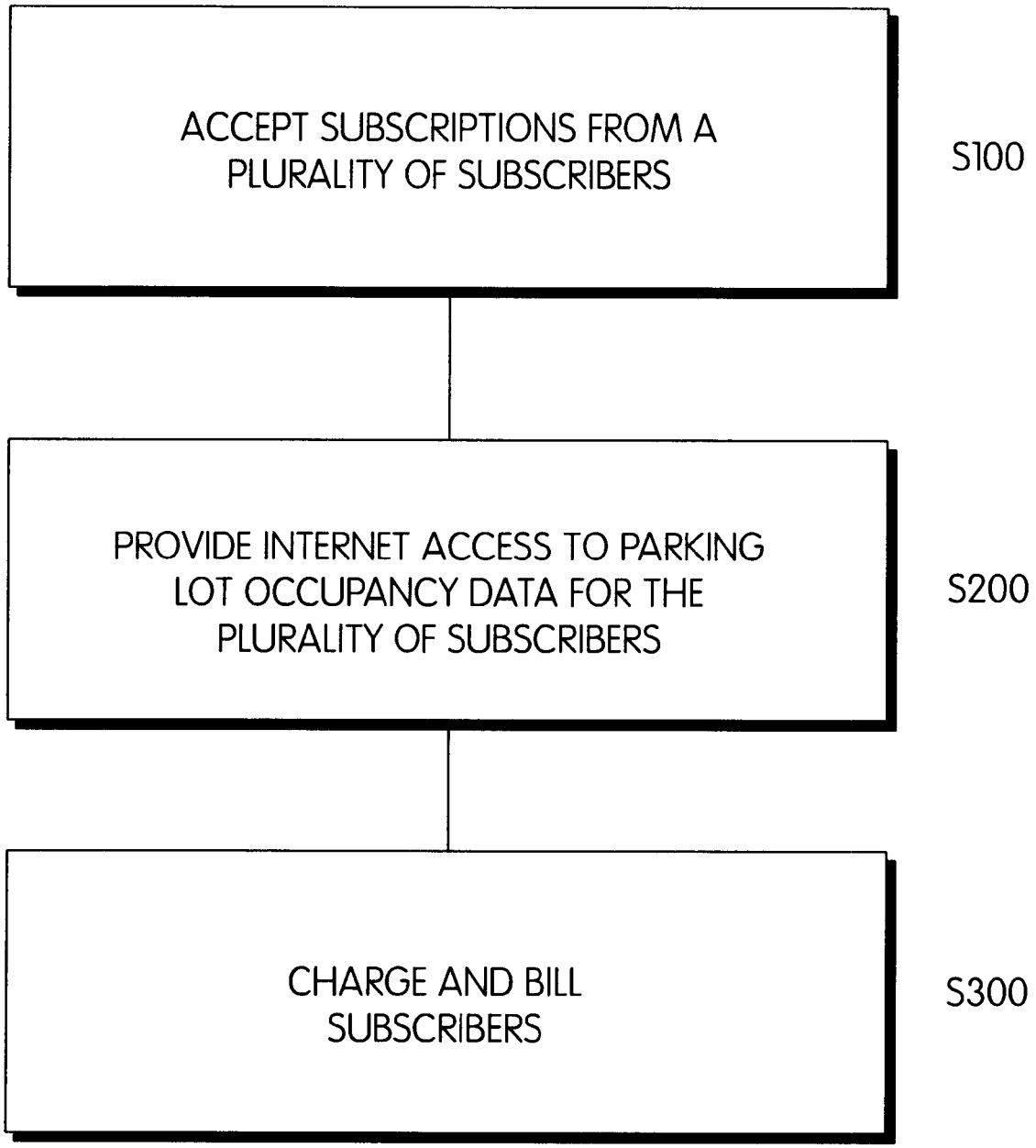
FIG. 4 is a flow chart of a communications method.

The operation of one implementation of the present invention will now be described with reference to FIG. 3.

In response to commands from the controller 11, the server 12 retrieves status information from one or more of the parking lots 13, 14 (S10). This may entail the controller 11 commanding the server 12 to poll or query the occupancy status of the parking lots 13, 14 or commanding the server 12 to accept status information periodically sent from the parking lots 13, 14.

After the server 12 has retrieved the status information, the controller 11 instructs the server 12 to perform data processing in order convert the status information into parking lot occupancy data capable of being reproduced by a remote display device 16 (S20). Such data processing may or may not be required depending on the form of the retrieved status information.

The controller 11 then commands the server 12 to transmit the parking lot occupancy data over the Internet 15 (S30). The parking lot occupancy data corresponds to one or more of the parking lots 13, 14 and is capable of being reproduced by a remote display device 16 as a real-time representation of the parking lot 13, 14 indicating vacant parking spaces within the parking lots 13, 14. The real-time representation may be in the form of a textual listing, a graphical map, a video image, an Internet Web page or similar form and may indicate occupied parking spaces as well as reserved parking spaces.

Using a remote display device, a commuter can view the real-time representation of the parking lot and can readily locate an available parking space or decide to search for parking elsewhere.

The operation of another embodiment of the present invention will now be described with reference to FIG. 3. In this embodiment of the present invention, the controller 11 commands the server 12 to accept subscriptions from a plurality of subscribers (S100). The controller 11 commands the server 12 to provide Internet accessibility to parking lot occupancy data corresponding to at least one parking lot for the plurality subscribers (S200). Subscribers may access the real-time representation through the Internet by visiting a Web site or transmitting an email request, for example. The server 12 may provide access for a fee. Accordingly, the controller 11 may command the server 12 to appropriately charge and bill subscribers (S300).

Figure 5:
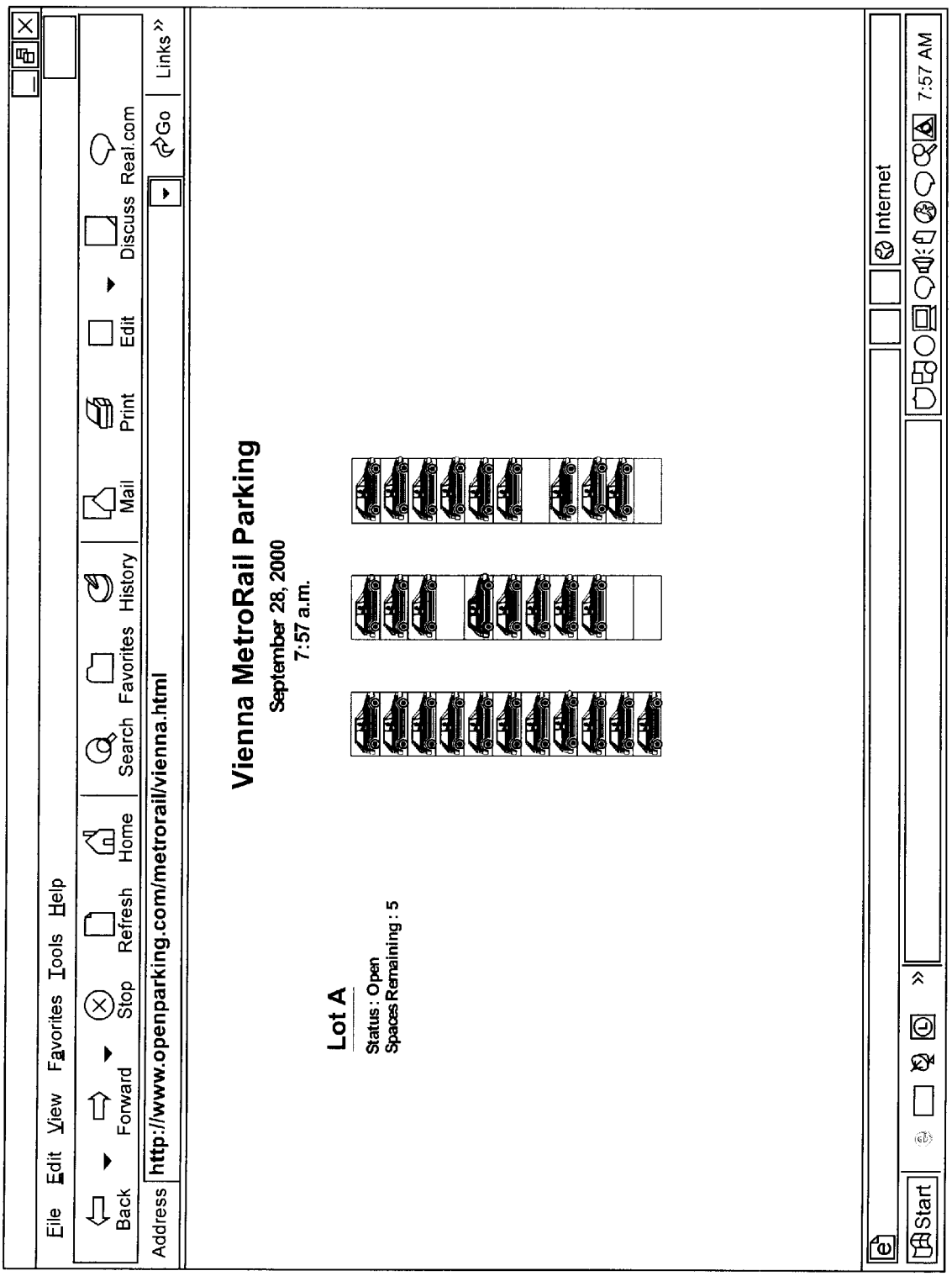
FIG. 5 is a graphical user interface.

Again, the parking lot occupancy data capable is capable of being reproduced by each of the remote display devices as a real-time representation of the parking lot indicating at least vacant parking spaces within the parking lot. The real-time representation may be in the form of a textual listing, a graphical map, a video image, an Internet Web page or a combination of such forms and may indicate occupied parking spaces as well as reserved parking spaces. FIG. 5 is one example of a graphical user interface that may be displayed to a commuter.

As described above, the present invention will facilitate a commuter's search for a parking space by utilizing the capabilities of the Internet to display a real-time representation of available parking spaces within a parking lot.

It should be understood that the embodiments described above are only examples of the present invention and are not intended to limit the scope of the following claims.

What is claimed is:

1. A parking system comprising:
    a server that is accessible over the Internet by a subscriber using a wireless communications device; and
    a software application that instructs the server to transmit parking data over the Internet to the wireless communications device of the subscriber, wherein
    the parking data can be rendered by the subscriber using the wireless communications device as a substantially real-time representation indicating an occupancy condition of an available parking lot, and
    the occupancy condition changes according to presence and absence of vacant parking spaces within the available parking lot.

2. The parking system of claim 1 wherein the available parking lot comprises a public parking lot.

3. The parking system of claim 1 wherein the available parking lot comprises a reserved parking lot for which the subscriber has a reservation.

4. The parking system of claim 1 wherein the available parking lot comprises a parking lot in geographic proximity to the subscriber.

5. The parking system of claim 1 wherein the available parking lot comprises a parking lot in geographic proximity to a travel destination.

6. The parking system of claim 1 wherein the available parking lot comprises at least one of an airport parking lot, a hospital parking lot, a mass transit station parking lot, an entertainment forum parking lot, and shopping mall parking lot.

7. The parking system of claim 1 wherein the real-time representation comprises a map identifying a location of at least one available parking lot having an occupancy condition corresponding to at least one vacant parking space being present within the available parking lot.

8. The parking system of claim 1 wherein the real-time representation comprises a map identifying a location of at least one available parking space within an available parking lot having an occupancy condition corresponding to at least one vacant parking space being present within the available parking lot.

9. The parking system of claim 1 wherein the real-time representation comprises a Web page.

10. The parking system of claim 1 wherein the real-time representation comprises number of vacant parking spaces present within the available parking lot.

11. The parking system of claim 1 wherein the wireless communications device comprises a vehicle-mounted device.

12. The parking system of claim 1 wherein the wireless communications device comprises a hand-held device.

13. The parking system of claim 1 wherein the subscriber is associated with a wireless service provider.

14. The parking system of claim 1 wherein the subscriber is associated with an Internet service provider.

15. A parking system comprising:
    a server that is accessible over the Internet by a display device; and
    a software application that instructs the server to transmit parking data over the Internet to the display device, wherein
    the parking data can be rendered by the display device as a substantially real-time representation indicating an occupancy condition of an available parking lot,
    the occupancy condition changes according to presence and absence of vacant parking spaces within the available parking lot, and
    the real-time representation comprises a map identifying a location of at least one available parking space within an available parking lot having an occupancy condition corresponding to at least one vacant parking space being present within the available parking lot.

16. The parking system of claim 15 wherein the available parking lot comprises at least one of a public parking lot and a reserved parking lot.

17. The parking system of claim 15 wherein the available parking lot comprises a parking lot in geographic proximity to a travel destination.

18. The parking system of claim 15 wherein the available parking lot comprises at least one of an airport parking lot, a hospital parking lot, a mass transit station parking lot, an entertainment forum parking lot, and a shopping mall parking lot.

19. The parking system of claim 15 wherein the real-time representation comprises a Web page.

20. The parking system of claim 15 wherein the real-time representation comprises a map identifying a location of at least one available parking lot having an occupancy condition corresponding to at least one vacant parking space being present within the available parking lot.

* * * * *